(12) United States Patent
Hindman et al.

(10) Patent No.: US 9,559,066 B2
(45) Date of Patent: Jan. 31, 2017

(54) SYSTEMS AND METHODS FOR DETECTING AND PREVENTING OPTICAL ATTACKS

(71) Applicant: Broadcom Corporation, Irvine, CA (US)

(72) Inventors: Nathan Hindman, Chandler, AZ (US); Mark Buer, Payson, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/715,208

(22) Filed: May 18, 2015

(65) Prior Publication Data

US 2015/0364433 A1  Dec. 17, 2015

Related U.S. Application Data

(60) Provisional application No. 62/011,176, filed on Jun. 12, 2014.

(51) Int. Cl.
| | |
|---|---|
| H03K 19/20 | (2006.01) |
| H01L 23/00 | (2006.01) |
| G06F 21/70 | (2013.01) |
| H01L 27/092 | (2006.01) |
| H01L 29/08 | (2006.01) |
| H03K 3/356 | (2006.01) |
| G06F 21/55 | (2013.01) |
| G06F 21/72 | (2013.01) |
| G06F 21/86 | (2013.01) |

(52) U.S. Cl.
CPC ........... *H01L 23/576* (2013.01); *G06F 21/554* (2013.01); *G06F 21/70* (2013.01); *G06F 21/72* (2013.01); *G06F 21/86* (2013.01); *H01L 27/092* (2013.01); *H01L 29/0847* (2013.01); *H03K 3/356* (2013.01); *H03K 19/20* (2013.01); *H01L 2924/0002* (2013.01)

(58) Field of Classification Search
CPC ........ H01L 21/268; H01L 27/14; H03K 19/00
USPC .............................. 326/16, 14; 257/428, 429
See application file for complete search history.

(56) References Cited

U.S. PATENT DOCUMENTS

| | | | | |
|---|---|---|---|---|
| 2004/0120195 A1* | 6/2004 | Okuda | ................. | G06K 19/073 365/200 |
| 2010/0301873 A1* | 12/2010 | Nobukata | ............... | G06F 21/75 324/537 |

* cited by examiner

*Primary Examiner* — Daniel D Chang
(74) *Attorney, Agent, or Firm* — Sterne, Kessler, Goldstein & Fox PLLC

(57) ABSTRACT

The present disclosure outlines various systems and methods for detecting an optical fault injection within an electronic device and/or preventing the optical fault injection from introducing an exploitable abnormality within the electronic device. These various systems and methods can include systems and methods that can detect or prevent laser injection attacks, which can include one or more small footprint complementary metal oxide silicon (CMOS) light detection circuits, or structures that can shield one or more transistors from a bottom side laser injection attack.

20 Claims, 4 Drawing Sheets

US 9,559,066 B2

SYSTEMS AND METHODS FOR DETECTING AND PREVENTING OPTICAL ATTACKS

CROSS-REFERENCE TO RELATED APPLICATIONS

The present application claims the benefit of U.S. Provisional Patent Appl. No. 62/011,176, filed Jun. 12, 2014, which is incorporated herein by reference in its entirety.

BACKGROUND

Field of Disclosure

The present disclosure generally relates to securing sensitive information stored in an electronic device and specifically to detecting an optical fault injection within the electronic device and/or preventing the optical fault injection from introducing an exploitable abnormality within the electronic device.

Related Art

In the digital economy of today, consumers are placing an ever increasing an amount of sensitive information onto their electronic devices. The electronic devices include various types of security modules, such as bank chip cards, subscriber identification units, and/or secure contactless cards to provide some examples, which are specialized to restrict and/or prevent access to sensitive information stored within. The sensitive information can include financial information such as bank account information and/or credit card information, personal information such as social security identification numbers, login information for various websites, and/or contact information and/or other types of sensitive information such as encryption algorithm keys, authentication or identification codes, and/or algorithms implemented for the encryption, the authentication, or the identification.

The increasing speed and density of electronic devices, as well as their reduced power consumption, have made the electronic devices increasingly sensitive to a fault-injection attack. The fault-injection attack is an attempt by an attacker to cause an error within an electronic device to cause it to behave abnormally. Thereafter, the attacker can exploit these abnormalities to identify or create a security weakness which can either expose the sensitive information or allow the attacker to simply bypass security measures within the electronic device.

BRIEF DESCRIPTION OF THE DRAWINGS/FIGURES

Figure 2:
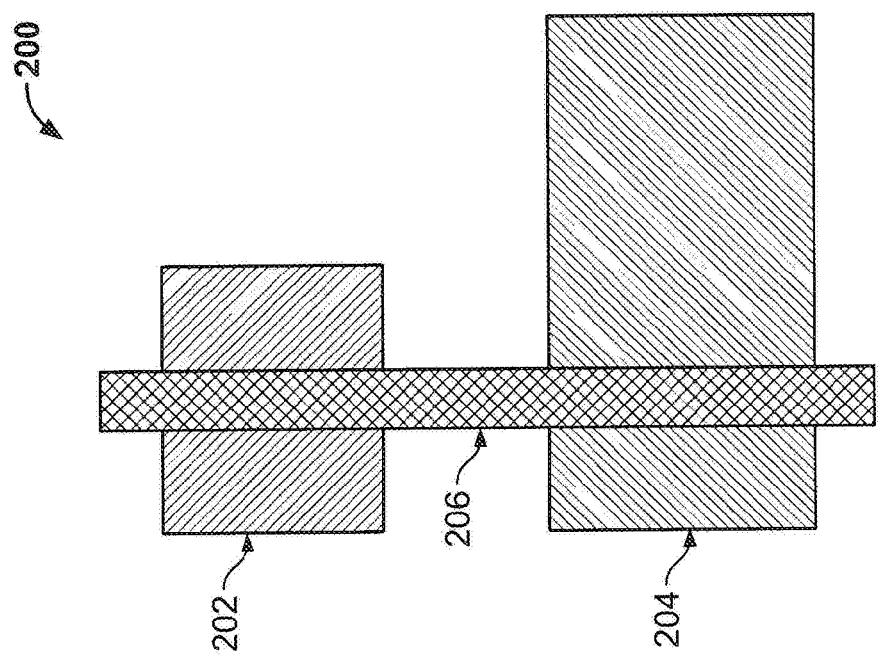
FIG. 2 illustrates a technique for preventing a laser injection attack according to an exemplary embodiment of the present disclosure.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

Overview

The present disclosure outlines various systems and methods for detecting an optical fault injection within an electronic device and/or preventing the optical fault injection from introducing an exploitable abnormality within the electronic device. These various systems and methods can include systems and methods that can detect or prevent laser injection attacks, which can include one or more small footprint complementary metal oxide silicon (CMOS) light detection circuits, or structures that can shield one or more transistors from a bottom side laser injection attack.

Optical Fault Injection Technique

Figure 1:
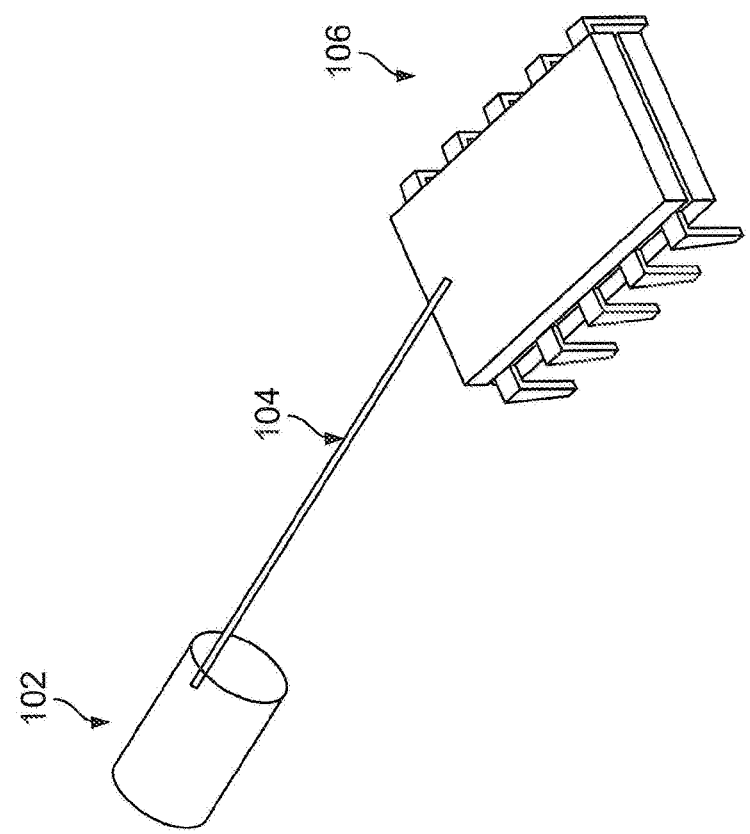
FIG. 1 illustrates a conventional optical fault injection technique.

FIG. 1 illustrates a conventional optical fault injection technique. One known fault-injection technique, referred to as optical fault injection, uses a strong light source, such as a wide spectrum global light-beam, a wide spectrum focused light-beam, or a single wavelength laser-beam to provide some examples, to exploit an inherent sensitively of an electronic device to light. The strong light source induces alternations in the behavior of the electronic device which can be exploited by an attacker.

For example, a laser emission device 102 emits light through a process of optical amplification based on the stimulated emission of electromagnetic radiation. The light can include electromagnetic radiation of any frequency, such as the visible spectrum, the infrared spectrum, or the ultraviolet spectrum to provide some examples. As illustrated in FIG. 1, the laser emission device 102 focuses a narrow beam 104 of the light onto an electronic device 106. Although the electronic device 106 is illustrated as being an integrated circuit, this is for exemplary purposes only. Those skilled in the relevant art(s) will recognize that the electronic device 102 can represent any suitable electronic device, such as a mobile communication device or a computing device, or one or more passive components and/or one or more active components of the suitable electronic device to provide some examples. Often times, the electronic device 106 is placed within a package as illustrated in FIG. 1. In this situation, the attacker can optically expose the electronic device 106 before focusing the narrow beam 104 of the light onto the electronic device 106.

The narrow beam 104 can be precise enough to accurately target a specific region of the electronic device 106. The specific region can range from the electronic device 106 itself to one or more passive components and/or one or more active components of the electronic device 106. Most often, the narrow beam 104 represents an optical pulse of light. However, other representations are possible as will be apparent to those skilled in the relevant art(s) without departing from the spirit and scope of the present disclosure. Typically, the narrow beam 104 exploits the inherent sensitively of the electronic device 106 to light. The electronic device 106 often includes one or more active components that are formed onto a semiconductor substrate. In some situations, the narrow beam 104 can switch these one or more active components to introduce an optical fault into the electronic device 106. The optical fault can include access bypass, memory dumping, key nulling, differential fault analysis, or influencing countermeasures to provide some examples.

Preventing of Laser Injection Attacks on Combinational Logic

FIG. 2 illustrates a technique for preventing a laser injection attack according to an exemplary embodiment of the present disclosure. An integrated circuit, such as the electronic device 106 to provide an example, includes one or more passive components and/or one or more active components that are configured and arranged to perform one or more functions. The one or more passive components and/or one or more active components can be fabricated onto one or more diffusion layers, one or more polysilicon layers, and/or one or more metal layers of a semiconductor substrate. These various layer can be interconnected to form the integrated circuit.

The one or more diffusion areas can be extended in a manner as illustrated in FIG. 2. As illustrated in FIG. 2, a combinational logic cell 200 includes a first diffusion region 202 and a second diffusion region 204 in a diffusion layer of the semiconductor substrate and a polysilicon layer 206 formed onto the first diffusion region 202 and the second diffusion region 204. The first diffusion region 202 represents a p-type diffusion layer that is used in forming p-type transistors for the one or more passive components and/or one or more active components within the semiconductor substrate and the second diffusion region 204 represents an n-type diffusion layer that is used in forming n-type transistors for the one or more passive components and/or one or more active components within the semiconductor substrate. The polysilicon layer 206 is typically used to form interconnections between the one or more passive components and/or one or more active components.

Typically, the first diffusion region 202 is characterized as forming a "small" drain region for the p-type transistors and the second diffusion region is characterizing as forming a "large" drain region for the n-type transistors. However, this example is not limiting, those skilled in the relevant art(s) will recognize that the first diffusion region 202 can be characterized as forming a "large" drain region for the p-type transistors and the second diffusion region can characterizing as forming a "small" drain region for the n-type transistors without departing from the spirit and scope of the present disclosure.

During a laser injection attack, for example as discussed in FIG. 1, the "small" drain region for the p-type transistors and the "large" drain region for the n-type transistors can form a diode to collect charge from the semiconductor substrate. The charge accepted by the p-type transistors can increase the accumulated charge in the first diffusion region 202 and the charge donated by the n-type transistors can decrease the accumulated charge in the second diffusion region 204. A magnitude of this collected charge typically depends on the fabrication layout of the first diffusion region 202 and the second diffusion region 204. The size of the first diffusion region 202 and/or of the second diffusion region 204 can be augmented to affect the magnitude of the collected charge during the laser injection attack.

For example, as illustrated in FIG. 2, the size of the second diffusion region 204 is larger than the size of the first diffusion region 202 so that more charge will be donated by the second diffusion region 204 than is accepted by the first diffusion region 202 during the laser injection attack. As a result, an output of the combinational logic cell 200 is to be driven or biased to a logical low value during the laser injection attack. Alternatively, the size of the second diffusion region 204 is smaller than the size of the first diffusion region 202 so that less charge will be donated by the second diffusion region 204 than is accepted by the first diffusion region 202 during the laser injection attack. As a result, the output of the combinational logic cell 200 is to be driven or biased to a logical high value during the laser injection attack. The driving of the output of the combinational logic cell 200 to either the logical low or the logical high can cause the output of the combinational logic cell 200 to be driven to a safe state during the laser injection attack, namely either the logical low or the logical high. As a result, the output of the combinational logic cell 200 does not enter a state that can cause a fault during the laser injection attack.

The size of the first diffusion region 202 and/or of the second diffusion region 204 can be implemented at either the cell or the circuit level. For example, the size of the first diffusion region 202 and/or of the second diffusion region 204 can be increased inside the fabrication layout of the combinational logic cell 200 or a separate diode can be attached to the output of the combinational logic cell 200 and placed proximate to the combinational logic cell 200.

One or More Small Footprint CMOS Light Detection Circuits

Figure 3:
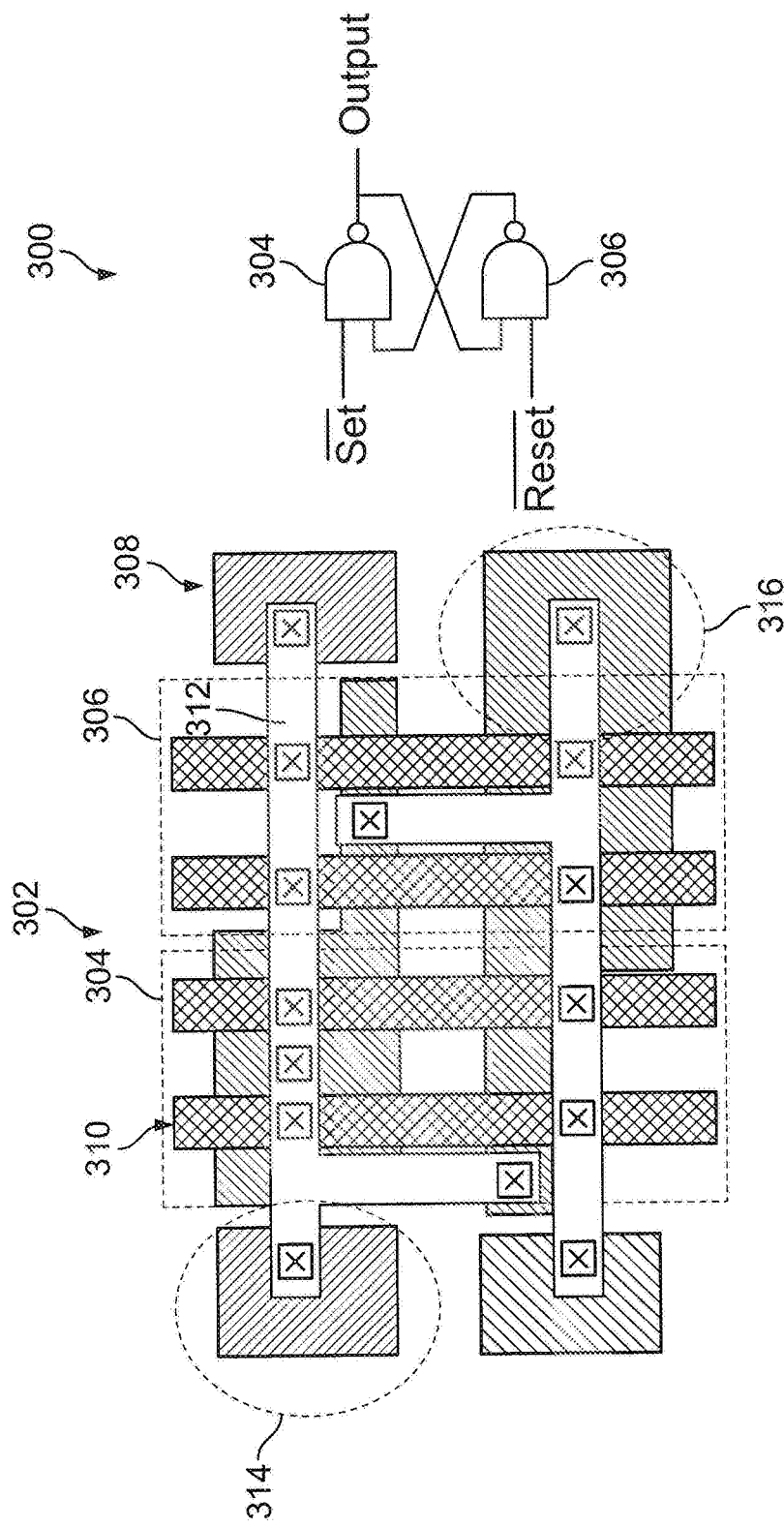
FIG. 3 illustrates one or more small footprint CMOS light detection circuits according to an exemplary embodiment of the present disclosure.

FIG. 3 illustrates one or more small footprint CMOS light detection circuits according to an exemplary embodiment of the present disclosure. A light detection circuit 300 and its corresponding fabrication layout 302 are illustrated in FIG. 3. The light detection circuit 300 includes a biased set-reset (S-R) latch having a first logical NAND gate 304 cross-coupled with a second logical NAND gate 306. As illustrated in FIG. 3, the light detection circuit 300 can be defined in terms of planar geometric shapes which correspond to one or more diffusion layers 308, one or more polysilicon layers 310, and/or one or more interconnections 312 between layers as illustrated by the fabrication layout 302 in FIG. 3. The one or more diffusion layers 308 include a "large" drain region 314 for p-type transistors of the first logical NAND gate 304 and a "large" drain region 316 for n-type transistors of the second logical NAND gate 306 to form a laser detection circuit. For convenience, the "large" drain region 314 is illustrated as being a circuit level implementation of the drain area extension and the "large" drain region 316 is illustrated as being a cell level implementation of the drain area extension as discussed above in FIG. 2. However, those skilled in the relevant art(s) will recognize that the large" drain region 310 and/or the "large" drain region 316 can be implemented differently without departing from the spirit and scope of the present disclosure.

The "large" drain region 314 and/or the "large" drain region 316 can increase the sensitivity of the biased S-R latch to a laser injection attack, for example as discussed in FIG. 1. As illustrated in FIG. 3, the "large" drain region 314 is at a logical low and the "large" drain region 316 is at a logical high, referred to as an initial state of the light detection circuit 300. The input $\overline{set}$ and the input $\overline{reset}$ of the biased S-R latch can be used to initialize the biased SR latch to the initial state and to test functionality of the biased S-R latch to ensure that the biased S-R latch has not been tampered with. In this initial state, an output of the light detection circuit 300 is at a logical low.

During the laser injection attack, the "large" drain region 314 can change to a logical high and the "large" drain region 316 can change to a logical low, referred to as a detect state of the light detection circuit 300. The "large" drain region 314 can accept charge from the semiconductor substrate and the "large" drain region 316 can donate charge to the semiconductor substrate during the laser injection attack. This change from the logical low to the logical high by the "large" drain region 314 and from the logical high to the logical low by the "large" drain region 316 causes the output of the light detection circuit 300 to be at a logical high which can be detected.

Due to its relatively small size in comparison to other electronic components of an integrated circuit, the light detection circuit 300 can be easily intermingled with other electronic components of the integrated circuit. This allows multiple light detection circuits 300 to be arrayed in a gird to detect the laser injection attack upon the integrated circuit. Additionally, the relatively small size of the light detection circuit 300 can allow the light detection circuit 300 to be paired with critical components within the integrated circuit to ensure there is a detector cell near these critical components to detect the laser injection attack.

Shielding Transistors from a Bottom Side Laser Injection Attack

Figure 4:
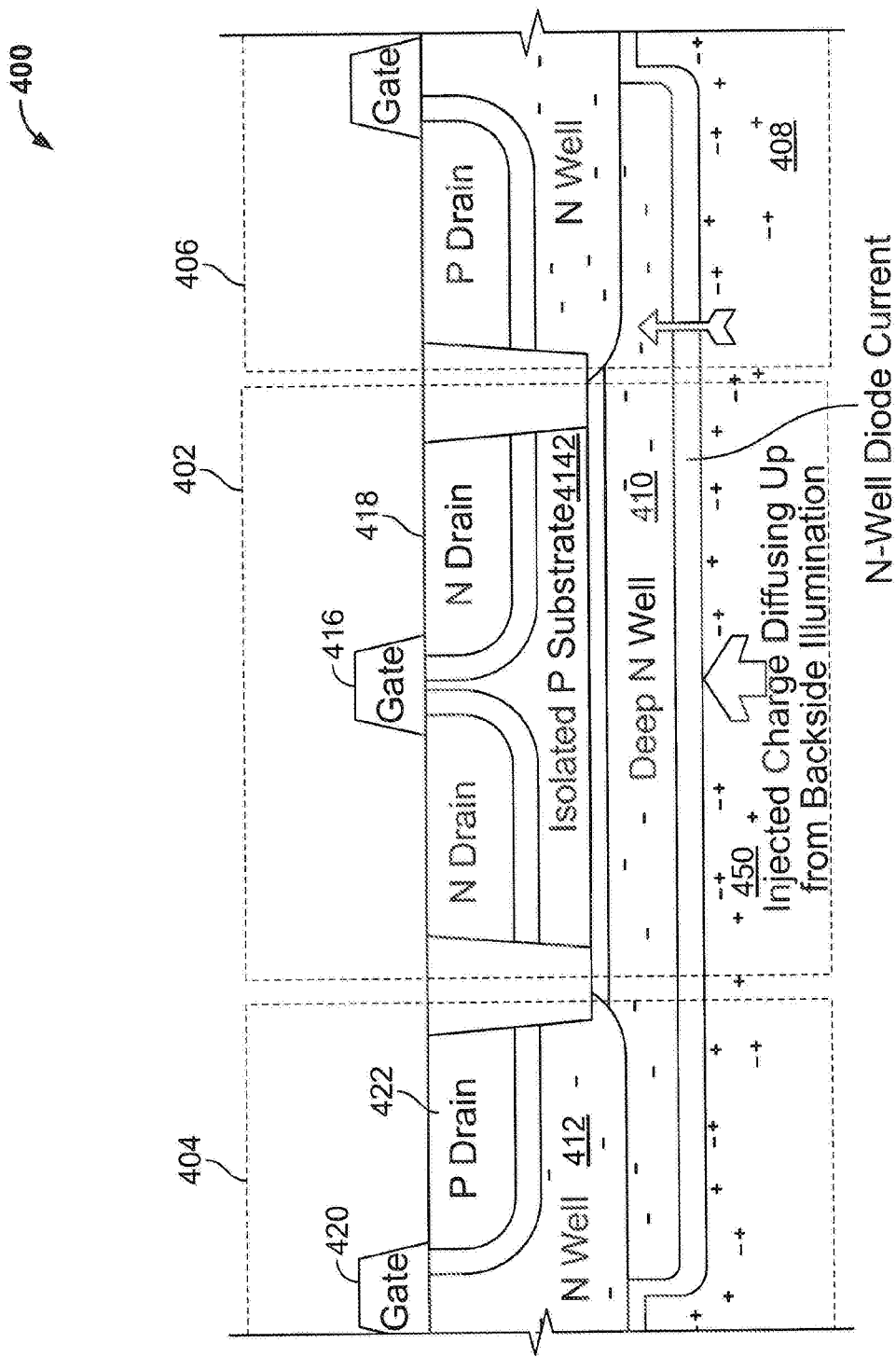
FIG. 4 illustrates a technique for shielding one or more transistors from a bottom side laser injection attack according to an exemplary embodiment of the present disclosure.

FIG. 4 illustrates a technique for shielding one or more transistors from a bottom side laser injection attack according to an exemplary embodiment of the present disclosure. An integrated circuit is fabricated onto a semiconductor substrate having a top side and a bottom side. The one or more diffusion layers, the one or more polysilicon layers, and/or the one or more interconnections between layers of the integrated circuit are often formed onto the top side of the semiconductor substrate to form a top side of the integrated circuit. Conventional shielding technique presently exist to shield the top side of the integrated circuit from a laser injection attack, for example as discussed in FIG. 1. However, these conventional shield methods can be avoided by illuminating a bottom side of the integrated circuit with the laser injection attack.

As illustrated in FIG. 4, an integrated circuit 400 can include a n-type transistor 402, a first p-type transistor 404, and a second p-type transistor 406 that are formed onto a p-type semiconductor substrate 408. It should be noted that this is for illustrative purposes only, the integrated circuit 400 can include only n-type transistors, only p-type transistors, or any suitable combination of n-type and p-type transistors that will be apparent to those skilled in the relevant art(s) without departing from the spirit and scope of the present disclosure. Although the integrated circuit 400 is to be described as being formed onto a p-type semiconductor substrate, those skilled in the relevant art(s) will recognize that similar integrated circuits may be formed onto a n-type semiconductor substrate without departing from the spirit and scope of the present disclosure.

Often times, when light, such as the narrow beam 104 to provide an example, from the laser injection attack is injected through the bottom side of the integrated circuit 400, a current is generated from a charge 450 diffusing from within the p-type semiconductor substrate 408. As also illustrated in FIG. 4, a deep n-well 410 is formed within the p-type semiconductor substrate 408 leaving an isolated p-type semiconductor substrate region 414 between the deep n-well 410 and a gate region 416, and/or a source/drain region 418 of the n-type transistor 402. It should be noted that other well processes, such as triple-well processes, can be similarly used in place of or in conjunction with the deep n-well 410 without departing from the spirit and scope of the present disclosure. As the charge 450 within the p-type semiconductor substrate 408 diffuses through the p-type semiconductor substrate 408 during the laser injection attack on the bottom side of the integrated circuit, a first P to N diode interface between the p-type semiconductor substrate 408 and the deep n-well 410 can repel holes from the charge 450 from diffusing onto the gate region 416 and/or the source/drain region 418 of the n-type transistor 402. On the other hand, electrons from the charge 450 diffuse through this first P to N diode interface. However, a first N to P diode interface between the deep n-well 410 and the isolated p-type semiconductor substrate region 414 can repel the electrons from diffusing onto the gate region 416 and/or the source/drain region 418.

As further illustrated in FIG. 4, as the charge 450 from deep within the p-type semiconductor substrate 408 diffuses through the p-type semiconductor substrate 408 during the laser injection attack on the bottom side of the integrated circuit, a second P to N diode interface between the p-type semiconductor substrate 408 and the n-well 412 can repel holes from the charge 450 from diffusing onto a gate region 420 and/or a source/drain region 422 of the first p-type transistor 404 and/or the second p-type transistor 406. On the other hand, electrons from the charge 450 diffuse through this first P to N diode interface. However, a second N to P diode interface between the n-well 412 and the gate region 420 and/or the source/drain region 422 of the first p-type transistor 404 and/or the second p-type transistor 406 can repel the electrons from diffusing onto the gate region 420 and/or the source/drain region 422 of the first p-type transistor 404 and/or the second p-type transistor 406.

Detecting Laser Injection Attacks by Monitoring N-Well Bias Current

Figure 5:
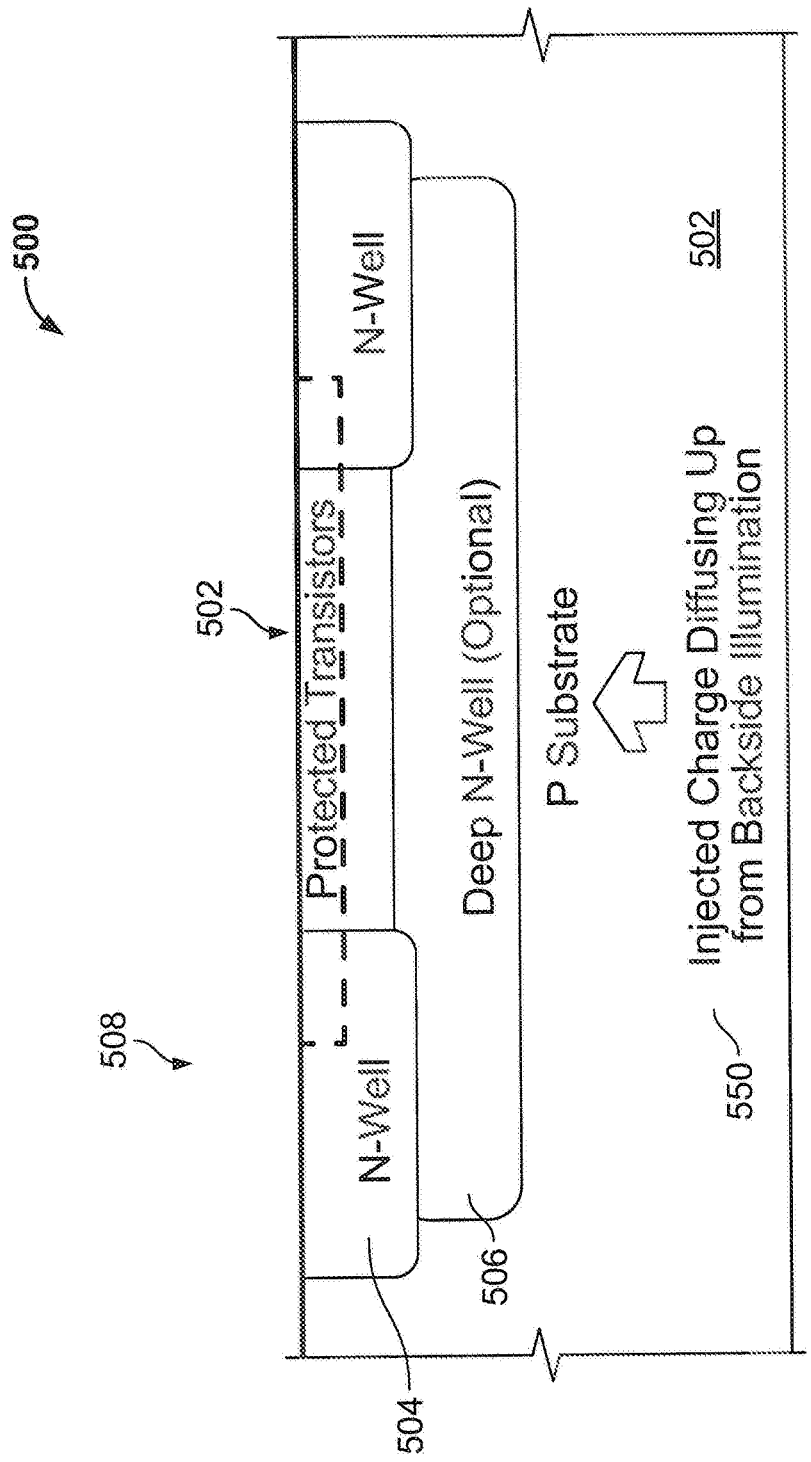
FIG. 5 illustrates a technique for detecting laser injection attacks according to an exemplary embodiment of the present disclosure.

FIG. 5 illustrates a technique for detecting laser injection attacks according to an exemplary embodiment of the present disclosure. As illustrated in FIG. 5, an integrated circuit 500 includes one or more protected transistors 502. The one or more protected transistors 502 can represent exemplary embodiments of the a n-type transistor 402, the first p-type transistor 404 and/or the second p-type transistor 406. The integrated circuit 500 can include an n-well 504 and an optional deep n-well 506.

During a laser injection attack, for example as discussed in FIG. 1, on the bottom side of the integrated circuit 500, a charge 550 diffusing from the bottom side of a p-type semiconductor substrate 510 generates a current on a reversed biased P to N diode between the p-type semiconductor substrate 510 and the n-well 504. This current is generally larger than a current that is normally generated on this reversed biased P to N diode when the laser injection attack is not occurring. A detection system can be used to detect the current generated on the reversed biased P to N diode. The optional deep n-well 506 can be used to increase a difference between the current on the reversed biased P to N diode during the laser injection attack and the current on the reversed biased P to N diode when the laser injection attack is not present to allow for easier detection of the laser injection attack by the detection system. It should be noted that the technique for detecting laser injection attacks as described in FIG. 5 can also be used to detect for a laser injection attack on a top side of the integrated circuit 500.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An integrated circuit formed onto a semiconductor substrate for detecting a laser injection attack, the integrated circuit comprising:
   a first diffusion region, within the semiconductor substrate, that forms a first region of a first transistor; and
   a second diffusion region, within the semiconductor substrate, that forms a second region of a second transistor,
   wherein the first transistor and the second transistor are implemented as part of a latching circuit, the latching circuit being at a first logical level and changing to a second logical level, different from the first logical level, in response to a first charge being accepted by or donated to the semiconductor substrate by the first diffusion region or a second charge being donated to or accepted by the semiconductor substrate during the laser injection attack.

2. The integrated circuit of claim 1, wherein the first diffusion region comprises a p-type diffusion layer, and
   wherein the second diffusion region comprises an n-type diffusion layer.

3. The integrated circuit of claim 1, wherein the first transistor and the second transistor are a p-type transistor and an n-type transistor, respectively, and
   wherein the first diffusion region and the second diffusion region comprise:
      a drain region of the p-type transistor and a drain region of the n-type transistor, respectively.

4. The integrated circuit of claim 1, wherein the size of the first diffusion region is less than the size of the second diffusion region, and
   wherein the first charge accepted or donated by the first diffusion region is less than the second charge donated or accepted by the second diffusion region during the laser injection attack.

5. The integrated circuit of claim 1, wherein the size of the first diffusion region is greater than the size of the second diffusion region, and
   wherein the first charge accepted or donated by the first diffusion region is greater than the second charge donated or accepted by the second diffusion region during the laser injection attack.

6. The integrated circuit of claim 1, wherein the first diffusion region is configured to be charged to a logical low and to change to a logical high and the second diffusion region is configured to be charged to a logical high and to change to a logical low during the laser injection attack.

7. The integrated circuit of claim 1, wherein the first diffusion region is configured to be charged to a logical high and to change to a logical low and the second diffusion region is configured to be charged to a logical low and to change to a logical high during the laser injection attack.

8. The integrated circuit of claim 1, wherein the latching circuit is a set-reset (S-R) latch, the S-R latch comprising:
   a first logical NAND gate cross-coupled with a second logical NAND gate,
   wherein the first logical NAND gate includes the first transistor, and
   wherein the second logical NAND gate includes the second transistor.

9. An integrated circuit formed onto a semiconductor substrate for detecting a laser injection attack, the integrated circuit comprising:
   a first transistor formed within a first diffusion region of the semiconductor substrate; and
   a second transistor formed within a second diffusion region of the semiconductor substrate,
   wherein the first transistor and the second transistor are implemented as part of a latching circuit, the latching circuit being at a first logical level and changing to a second logical level, different from the first logical level, in response to a first charge being accepted by or donated to the semiconductor substrate by the first diffusion region or a second charge being donated to or accepted by the semiconductor substrate during the laser injection attack.

10. The integrated circuit of claim 9, wherein the first diffusion region comprises a p-type diffusion layer, and
    wherein the second diffusion region comprises an n-type diffusion layer.

11. The integrated circuit of claim 9, wherein the first transistor and the second transistor are a p-type transistor and an n-type transistor, respectively, and
   wherein the first diffusion region and the second diffusion region comprise:
      a drain region of the p-type transistor and a drain region of the n-type transistor, respectively.

12. The integrated circuit of claim 9, wherein the size of the first diffusion region is less than the size of the second diffusion region, and
   wherein the first charge accepted or donated by the first diffusion region is less than the second charge donated or accepted by the second diffusion region during the laser injection attack.

13. The integrated circuit of claim 9, wherein the size of the first diffusion region is greater than the size of the second diffusion region, and
   wherein the first charge accepted or donated by the first diffusion region is greater than the second charge donated or accepted by the second diffusion region during the laser injection attack.

14. The integrated circuit of claim 9, wherein the first diffusion region is configured to be charged to a logical low and to change to a logical high and the second diffusion region is configured to be charged to a logical high and to change to a logical low during the laser injection attack.

15. The integrated circuit of claim 9, wherein the first diffusion region is configured to be charged to a logical high and to change to a logical low and the second diffusion region is configured to be charged to a logical low and to change to a logical high during the laser injection attack.

16. The integrated circuit of claim 9, wherein the latching circuit is a set-reset (S-R) latch, the S-R latch comprising:
   a first logical NAND gate cross-coupled with a second logical NAND gate,
   wherein the first logical NAND gate includes the first transistor, and
   wherein the second logical NAND gate includes the second transistor.

17. A latching circuit formed onto a semiconductor substrate for detecting a laser injection attack, the latching circuit comprising:
   a first transistor formed within a first diffusion region of the semiconductor substrate; and
   a second transistor formed within a second diffusion region of the semiconductor substrate,
   wherein the latching circuit is configured to be at a first logical level and to change to a second logical level, different from the first logical level, in response to a first charge being accepted by or donated to the semiconductor substrate by the first diffusion region or a second charge being donated to or accepted by the semiconductor substrate during the laser injection attack.

18. The latching circuit of claim 17, wherein the latching circuit is a set-reset (S-R) latch, the S-R latch comprising:
   a first logical NAND gate cross-coupled with a second logical NAND gate,
   wherein the first logical NAND gate includes the first transistor, and
   wherein the second logical NAND gate includes the second transistor.

19. The latching circuit of claim 18, wherein the first diffusion region is coupled to a first input of the latching circuit, and
   wherein the second diffusion region is coupled to a second input of the latching circuit.

20. The latching circuit of claim 17, wherein the first transistor and the second transistor are a p-type transistor and an n-type transistor, respectively, and
   wherein the first diffusion region and the second diffusion region comprise:
      a drain region of the p-type transistor and a drain region of the n-type transistor, respectively.

\* \* \* \* \*